(12) United States Patent
Chandrashekarappa et al.

(10) Patent No.: US 10,089,894 B1
(45) Date of Patent: Oct. 2, 2018

(54) APPARATUS AND METHOD OF IMPLEMENTING AN AUGMENTED REALITY PROCESSED TERRAIN AND OBSTACLE THREAT SCOUTING SERVICE

(71) Applicant: Honeywell International Inc., Morris Plains, NJ (US)

(72) Inventors: Mohan Gowda Chandrashekarappa, Bangalore (IN); Visvanathan Thanigai Nathan, Bangalore (IN); Mohammed Ibrahim Mohideen, Bangalore (IN); Pranav Patel, Bangalore (IN)

(73) Assignee: HONEYWELL INTERNATIONAL INC., Morris Plains, NJ (US)

( * ) Notice: Subject to any disclaimer, the term of this patent is extended or adjusted under 35 U.S.C. 154(b) by 0 days.

(21) Appl. No.: 15/691,581

(22) Filed: Aug. 30, 2017

(51) Int. Cl.
| G08G 5/04 | (2006.01) |
| G06K 9/00 | (2006.01) |
| B64D 43/00 | (2006.01) |
| G06T 11/60 | (2006.01) |

(52) U.S. Cl.
CPC .............. *G08G 5/04* (2013.01); *B64D 43/00* (2013.01); *G06K 9/0063* (2013.01); *G06T 11/60* (2013.01)

(58) Field of Classification Search
CPC ............. B60W 2550/10; B60W 30/09; B60W 2050/146; B60W 50/14; G05D 1/0274; E02F 9/26; G01C 21/00
See application file for complete search history.

(56) References Cited

U.S. PATENT DOCUMENTS

| 7,859,449 | B1 | 12/2010 | Woodell et al. |
| 8,115,611 | B2 * | 2/2012 | Ozaki ............... G08G 1/166 340/435 |
| 9,583,011 | B2 | 2/2017 | Ott |
| 9,766,072 | B2 * | 9/2017 | Kim ............... B62D 15/0295 |

(Continued)

OTHER PUBLICATIONS

Cae, "Cae Augmented Visionics System (AVS)", "cae.com", , pp. 1-2.

(Continued)

*Primary Examiner* — Fekadeselass Girma
(74) *Attorney, Agent, or Firm* — Bookoff McAndrews, PLLC

(57) ABSTRACT

A method of operating an augmented reality processed terrain and obstacle threat scouting service is provided. The method includes using at least one sensor of a monitoring vehicle to monitor terrain and obstacle data. The monitored terrain and obstacle data is compared with terrain and obstacle data in a terrain and obstacle database. A non-validated georeferenced delta is determined when the comparison of the monitored terrain and obstacle data with terrain and obstacle data in the terrain and obstacle database finds non-matching terrain and obstacle data. The non-validated georeferenced delta is transmitted to a ground distribution center, consumer vehicle and/or cloud based server. Non-validated georeferenced delta received at a consumer vehicle is differentiated from other terrain and obstacle data on a synthetic vision display. Non-validated georeferenced delta received at a ground distribution center is validated against at least one other source and validated and non-validated is distributed to subscribing consumers.

20 Claims, 5 Drawing Sheets

(56) References Cited

U.S. PATENT DOCUMENTS

| | | | |
|---|---|---|---|
| 9,779,302 B1* | 10/2017 | Wu | G06T 7/70 |
| 9,840,252 B2* | 12/2017 | Bills | B60W 30/025 |
| 2004/0056182 A1* | 3/2004 | Jamieson | B61L 23/041 |
| | | | 250/221 |
| 2007/0171094 A1 | 7/2007 | Alter et al. | |
| 2007/0252748 A1* | 11/2007 | Rees | H01Q 1/28 |
| | | | 342/29 |
| 2009/0219199 A1* | 9/2009 | Borchert | E02F 9/26 |
| | | | 342/357.31 |
| 2012/0249342 A1* | 10/2012 | Koehrsen | G08G 1/16 |
| | | | 340/904 |
| 2015/0193917 A1* | 7/2015 | Schachter | H04N 5/33 |
| | | | 348/113 |
| 2015/0201605 A1* | 7/2015 | Groeneveld | A01M 17/00 |
| | | | 701/410 |
| 2015/0336575 A1* | 11/2015 | Zeng | B62D 15/0265 |
| | | | 701/41 |
| 2017/0158191 A1* | 6/2017 | Bills | B60W 30/025 |
| 2017/0217390 A1* | 8/2017 | Curtis | B60R 16/033 |
| 2017/0297588 A1* | 10/2017 | Doshi | B60W 50/10 |
| 2017/0340447 A1* | 11/2017 | Mahfouz | A61F 2/30942 |
| 2017/0358094 A1* | 12/2017 | Sun | G06T 7/194 |
| 2018/0059682 A1* | 3/2018 | Thode | G05D 1/0274 |
| 2018/0091966 A1* | 3/2018 | Cooper | H04B 1/082 |

OTHER PUBLICATIONS

Johnson et al., "Terrain Height Evidence Sharing for Collaborative Autonomous Rotorcraft Operation", "Presented at The AHS International Specialists' Meeting on Unmanned Rotorcraft and Network Centric Operations", 2013, pp. 1-9, Publisher: American Helicopter Society.

Eurocae, "User Requirements for Terrain and Obstacle Data", "ED-98A", Oct. 2005, pp. 1-74, Publisher: Eurocae.

Itkin et al., "Development of Cloud-Based UAV Monitoring and Management System", "Sensors 2016, 16, 1913", 2016, pp. 1-19.

Schaffner et al., "Benefits of Sharing Information From Commercial Airborne Forward-Looking Sensors in the Next Generation Air Transportation System", , pp. 1-8, Publisher: American Institute of Aeronautics and Astronautics.

\* cited by examiner

APPARATUS AND METHOD OF IMPLEMENTING AN AUGMENTED REALITY PROCESSED TERRAIN AND OBSTACLE THREAT SCOUTING SERVICE

BACKGROUND

A Synthetic Vision System (SVS) is a computer-mediated reality system. A SVS is commonly used in airborne systems to provide flight crews with clear, intuitive and unprecedented situational awareness of their flying environment by replacing a conventional sky and ground depiction on a Primary Flight Display (PFD) with a 3D representation of the external surrounding outside the aircraft. SVS combines a high resolution display, with data from precision databases that includes terrain and obstacle data, geo-political and hydrological data as well as other aeronautical information, data feeds from other aircraft and vehicles, and GPS technology to show pilots exactly where they are and how the aircraft is orientated.

An Enhanced Vision System (EVS) is a related technology which incorporates information from onboard sensors (such as, infrared (IR) cameras, near-infrared cameras, millimeter wave radar, multi-mode radar (MMR), LASER, etc.) to provide vision in limited visibility environments by overlaying the captured imagery on top of the synthesized imagery creating a Combined Vision System (CVS) which provides enhanced real time situational awareness. Obstacles such as terrain, structures, and vehicles or other aircraft on the runway that might not otherwise be seen are clearly visible with an IR/LASER/MMR image increasing the safety and the efficiency of terminal area operations.

The backbone of a Synthetic and Combined Vision System is an underlying detailed, high-resolution digital terrain and obstacle database. The terrain and obstacle database which originally found its application on the EGPWS (Enhanced Ground Proximity Warning Systems) has spawned off several related products and added unparalleled feature enhancements to existing products. Many of these innovations rely mostly on software to avoid the expense and difficulty of changing hardware in the cockpit at a time providing significant cost benefits to airlines. The SVS/EVS/CVS, the EGPWS, Synthetic Airport Moving Maps (AMM), Runway Awareness and Advisory System (RAAS) etc. are only a few innovative products which piggyback on terrain and obstacle databases.

The functioning, safety and operational benefits of the SVS, EVS, CVS, EGPWS, RAAS etc. are greatly dependent on the integrity and the completeness of the terrain and obstacle databases. Although current mechanisms for data procurement and building of terrain and obstacle databases perform a satisfactory job, they are cumbersome and involve a lot of manual intervention and processing. Once data is aggregated, it takes prolonged processing and distribution times. Limitations or challenges of current systems include; inaccurate terrain and obstacle databases that may lead to incidents and accidents, sensed data from onboard systems being leveraged for the current ownership flight mission but not used for other services, a longer update cycle of terrain and obstacle databases even though obstacles may be occurring more frequently, unregulated growth of obstacles and reporting mechanism, variety of obstacles growing over time while many aircrafts are not equipped with sense and avoid systems.

SUMMARY

The following summary is made by way of example and not by way of limitation. It is merely provided to aid the reader in understanding some of the aspects of the subject matter described. Embodiments provide a system of updating terrain and obstacle databases with the use of vehicle sensors in a crowd sourced application. Moreover some embodiments include display systems and techniques that intuitively differentiate stored, sensed, crowed sourced and ground validated terrain and obstacle data on the display system. The summary embodiments provided below are exemplary in nature and therefore one will appreciate that the transmitted georeferenced delta terrain and obstacle data could be used by other systems including, but not limited to, system like EGPWS, EVS, CVS, RAAS and alike.

In one embodiment, a method of implementing an augmented reality processed terrain and obstacle threat scouting service is provided. The method includes monitoring terrain and obstacle features with at least one vehicle sensor of a monitoring vehicle. Monitored terrain and obstacle data is compared with stored terrain and obstacle data within a vehicle terrain and obstacle database that is associated with the monitoring vehicle. Monitored terrain and obstacle data that is different than the stored terrain and obstacle data within the vehicle terrain and obstacle database is transmitted. Terrain and obstacle data stored in a distribution terrain and obstacle database at a remote distribution center is validated and updated based at least in part on the transmitted monitored different terrain and obstacle data from the monitoring vehicle. Terrain and obstacle data from the distribution terrain and obstacle database located at the remote distribution center is transmitted to at least one consumer vehicle. The monitored different terrain and obstacle data from the monitoring vehicle that is not validated by the remote distribution center is presented as non-validated georeferenced delta terrain and obstacle data and is differentially highlighted from validated terrain and obstacle data received from the remote distribution center on a display system of the at least one consumer vehicle.

In another example embodiment, another method of operating an augmented reality processed terrain and obstacle threat scouting service is provided. The method includes using at least one sensor of a monitoring vehicle to monitor terrain and obstacle data. The monitored terrain and obstacle data is compared with terrain and obstacle data in a terrain and obstacle database. A non-validated georeferenced delta is determined when the comparison of the monitored terrain and obstacle data with terrain and obstacle data in the terrain and obstacle database finds non-matching terrain and obstacle data. The non-validated georeferenced delta is transmitted. Moreover, the non-validated georeferenced delta is received at a consumer vehicle. Terrain and obstacle data are displayed on a synthetic vision system of the consumer vehicle. The non-validated georeferenced delta is differentiated from other terrain and obstacle data on the display.

In yet another embodiment, a terrain and obstacle threat scouting and reporting system that includes at least one monitoring vehicle and at least one consumer vehicle is provided. The monitoring vehicle includes at least one sensor to monitor terrain and obstacle data, at least one vehicle terrain and obstacle database, at least one processor and a vehicle communication system. The at least one processor is used to compare monitored terrain and obstacle data with stored terrain and obstacle data in the vehicle terrain and obstacle database and generate a non-validated geographical delta when the monitored terrain and obstacle data and the stored terrain and obstacle data do not match. The vehicle communication system is configured to transmit the generated non-validated geographical delta. The at least one consumer vehicle includes a synthetic vision system. The synthetic vision system is configured and arranged to display received non-validated geographical delta. The non-validated geographical delta is differentially highlighted from other terrain and obstacle data displayed by the synthetic vision system.

BRIEF DESCRIPTION OF THE DRAWINGS

Embodiments can be more easily understood and further advantages and uses thereof will be more readily apparent, when considered in view of the detailed description and the following figures in which.

Figure 1:
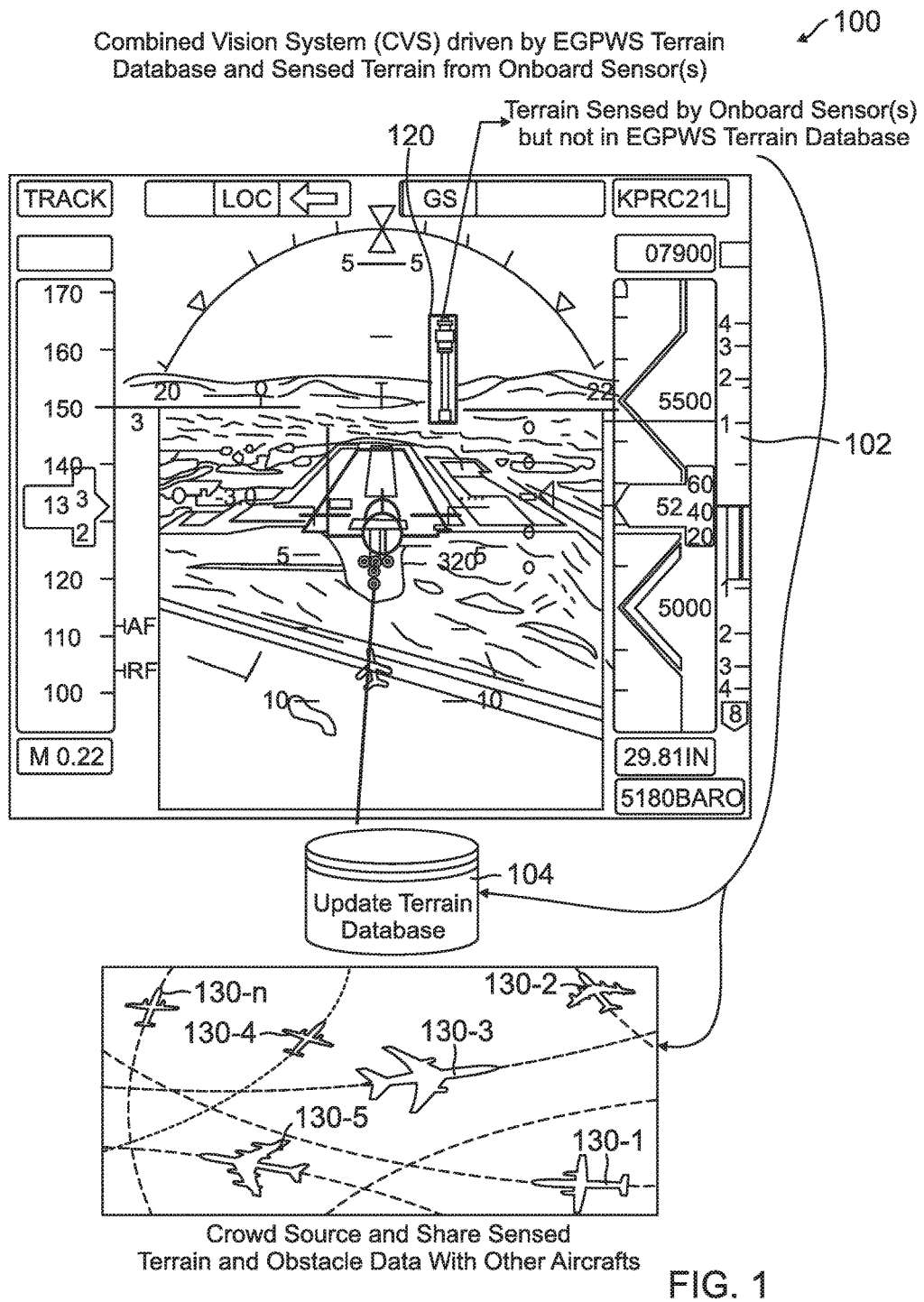
FIG. 1 is a terrain and obstacle information sharing system illustrating a sensed obstacle not in a current vehicle terrain and obstacle database according to one exemplary embodiment.

In accordance with common practice, the various described features are not drawn to scale but are drawn to emphasize specific features relevant to the subject matter described. Reference characters denote like elements throughout Figures and text. Moreover, the Figures provided are only exemplary in nature and alternative forms of information presentation on the display systems or architecture are possible. Moreover, the display systems as target applications for consuming the terrain and obstacle data is only exemplary in nature. One should appreciate the fact that the terrain and obstacle data from the database on the differential sensed terrain and obstacle information may find use in additional applications including, but not limited to, EGPWS, RAAS, ROAS, SmartRunway, SmartLanding etc.

DETAILED DESCRIPTION

In the following detailed description, reference is made to the accompanying drawings, which form a part hereof, and in which is shown by way of illustration specific embodiments in which the inventions may be practiced. These embodiments are described in sufficient detail to enable those skilled in the art to practice the embodiments, and it is to be understood that other embodiments may be utilized and that changes may be made without departing from the spirit and scope of the present invention. The following detailed description is, therefore, not to be taken in a limiting sense, and the scope of the present invention is defined only by the claims and equivalents thereof.

In embodiments, vehicles equipped with one or more sensors that detect terrain and obstacles are used as monitoring resources for terrain and obstacle databases to enhance safety of future travel of vehicles. Monitored surveillance data by the vehicle sensors are compared with data stored in vehicle terrain and obstacle databases. When a difference between the monitored data and the data in a vehicle terrain and obstacle database is detected, a non-validated georeferenced delta is generated. This non-validated georeferenced delta is then transmitted and used to update terrain and obstacle databases of consumer vehicles. In an embodiments, any non-validated georeferenced delta is differentially highlighted from other terrain and obstacle information presented on a display of the consumer vehicle. Embodiments have many applications. For example, the two way communication systems in embodiments may also be valuable for town planning, law enforcing, airspace planning, and terrain service providers. Embodiments also provide increased situational awareness, safety and efficiency for vehicle operators as well as a more accurate and real sensed or measured data as a source for terrain and obstacle database updates.

Embodiments may further be applied to a network connected aircraft system where terrain and obstacle information sensed by onboard sensors (such as near-infrared cameras, a millimeter wave radar, etc.) of an aircraft are crowd sourced to augment the accuracy and functioning of terrain and obstacle dependent cockpit avionics systems (such as an Enhanced Vision System (EVS) in real-time. Embodiments also enhance the integrity of terrain and obstacle databases. Each aircraft in the airspace becomes a source for terrain and obstacle information therein enhancing the safety of future flights. Some embodiments build and collate data for Enhanced Ground Proximity Warning Systems (EGPWS) terrain and obstacle upgrades in an airspace application. In addition, Obstacle and Threat Scouting (OTS) as a service provided in embodiments unleash the power of onboard obstacle sensing systems and data connectivity in augmenting vital information in real-time.

Referring to FIG. 1, an example of terrain and obstacle information sharing system 100 of an embodiment is illustrated. In the example of FIG. 1, a vision system 102 driven by a vehicle terrain and obstacle database (such as an EGPWS vehicle terrain and obstacle database) and having sensed data from a sensor (such as an IR camera/radar etc.) is illustrated. In this example embodiment, the IR camera/MMR of the monitoring vehicle senses an obstacle 120 that is not in its current EGPWS vehicle terrain and obstacle database. The example obstacle 120 is a newly constructed air traffic control tower 120. As a result of the discrepancy, a non-validated georeferenced delta is generated by a processor of the monitoring vehicle. The non-validated georeferenced delta is transmitted to enhance and update a terrain and obstacle database 104. In one embodiment, the terrain and obstacle database 104 is a distribution terrain and obstacle database 104 that is located at a distribution center. In another embodiment the transmitted non-validated georeferenced delta is received and processed by cloud based servers or ground operations departments. In other embodiments, the transmitted non-validated geo-referenced delta is received by other vehicles such as other aircraft 130-1 through 130-n. The received non-validated georeferenced delta may be further processed and collated to enhance and upgrade a terrain and obstacle database.

Figure 2:
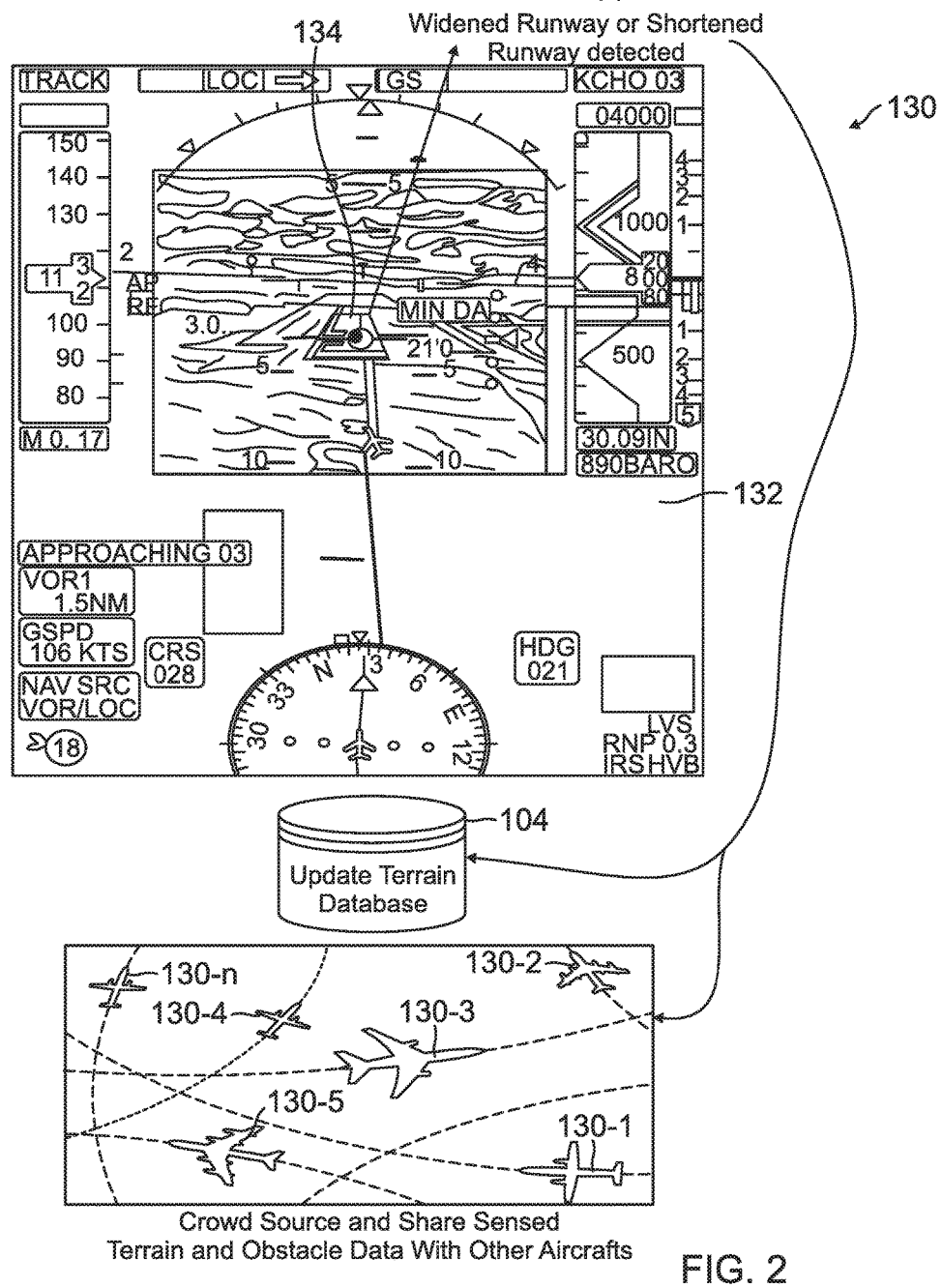
FIG. 2 is a terrain and obstacle information sharing system illustrating a sensed runway terrain change not in a current vehicle terrain and obstacle database according to one exemplary embodiment.

Referring to FIG. 2, another terrain and obstacle information sharing system 130 is illustrated. In this example embodiment, another vision system 132 driven by a vehicle terrain and obstacle database with sensed data from an onboard sensor(s) such as an IR camera/radar etc. is illustrated. In this example embodiment, the on board sensor(s) of the monitoring vehicle senses a change in terrain 134 that is not in its current vehicle terrain and obstacle base. In this example, the change in terrain is a widened runway 134. Another example would be a shortened runway. As a result of the discrepancy, a non-validated georeferenced delta is generated by a processor of the monitoring vehicle and is transmitted to update the terrain and obstacle database 104, which as discussed above, may be at a distribution center, a cloud based server system as well as other aircraft 130-1 through 103-n. In an embodiment, sensed differential terrain and portions validated by a ground processing center are differentiated on a display system as discussed in detail below. Hence, on the vision system the portion of the widened runway that is sensed by the onboard sensors is differentiated from stored validated terrain in the current EGPWS vehicle terrain and obstacle database.

Figure 3:
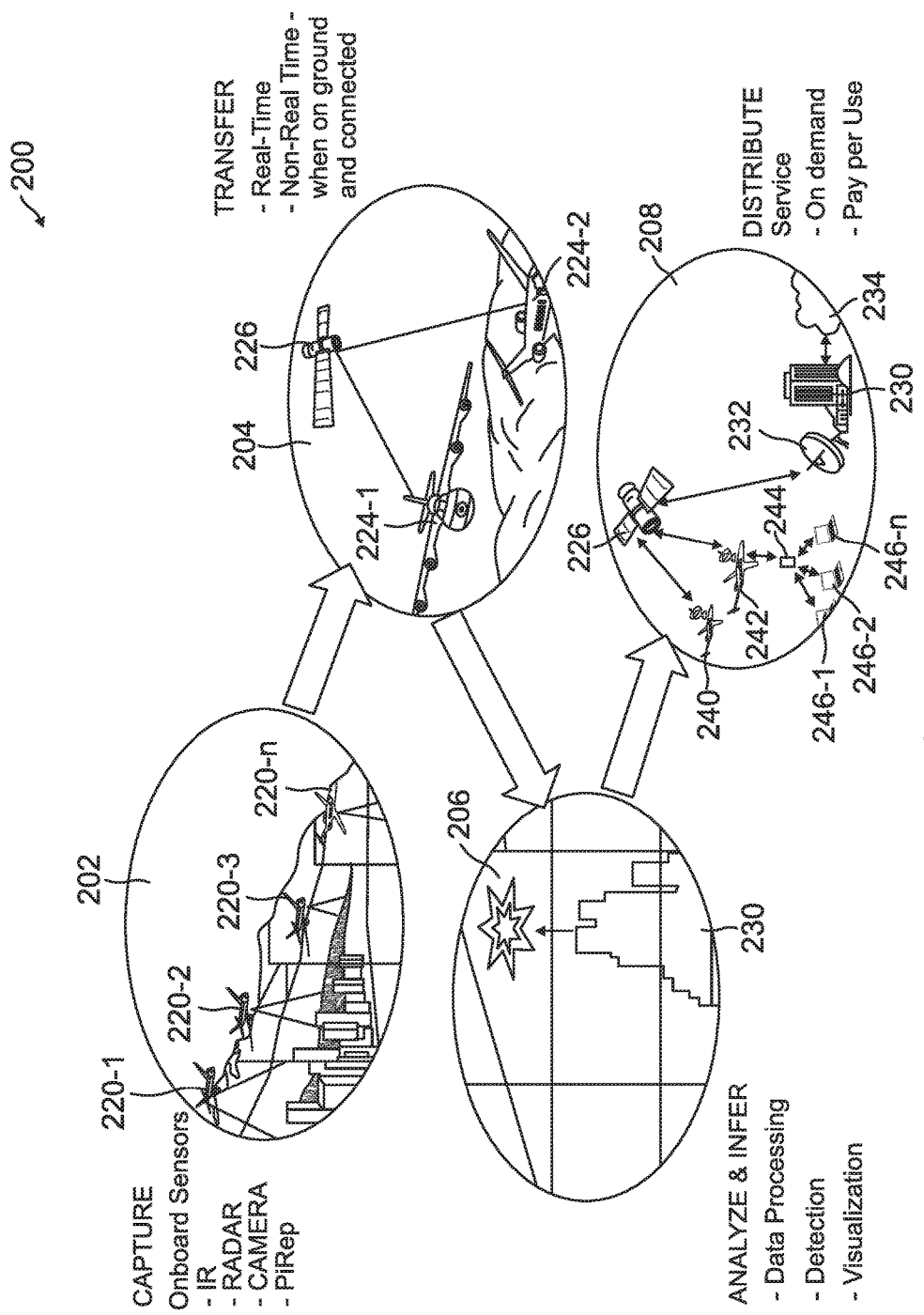
FIG. 3 is a real time information sharing system of an exemplary embodiment.

Referring to FIG. 3, a real time information sharing system 200 of an example embodiment is illustrated. At window 202, vehicles 220-1 through 220-n with onboard vehicle sensors capture terrain and obstacle information. The onboard sensors may include, but are not limited to IR sensors, Radars, cameras etc. Terrain and obstacle information captured by the sensors are then compared with information in vehicle terrain and obstacle databases of each respective monitoring vehicle 220-1 through 220-n. If there is a discrepancy, a non-validated georeferenced delta is generated. The generated non-validated georeferenced delta from each respective vehicle 220-1 through 220-n is then transmitted as indicated at window 204. In example window 204, the transmission of non-validated georeferenced delta from vehicles 224-1 and 224-2 is to a distribution center 230 as illustrated in window 206 via satellite connectivity 226. The distribution center 230 processes and collates the non-validated georeferenced delta. In one embodiment, the distribution center 230 adds the non-validated georeferenced delta to its distribution terrain and obstacle database and as illustrated in window 208. In an embodiment, the distribution center 230 may validate non-validated georeferenced delta based on one or more additional source confirmations. In embodiments, non-validated georeferenced delta is differentially marked from the other validated data in the distribution terrain and obstacle databases.

The distribution center 230 then validates and distributes its current terrain and obstacle data in its distribution terrain and obstacle database to consumers as indicated in window 208. In one embodiment, updated terrain and obstacle data is streamed in real time to vehicles having projected travel paths that cross locations with recently updated data relating to the non-validated georeferenced delta received by the distribution center. Window 208 illustrates two different communication method examples. The first method illustrates the distribution center 230 using a satellite uplink 232 to communicate the terrain and obstacle data to the satellite 226 which in turn communicates the terrain and obstacle data to consumer vehicles 240 and 242. The consumer vehicles 240 and 242 in an embodiment may subscribe to a service provided by the distribution center 230. The communication of the terrain and obstacle data may be provided on demand by a subscribed vehicle 240 and 242. Moreover, in one embodiment, the terrain and obstacle data may be provided on a pay per use basis.

Window 208 also illustrated that the distribution center 230 in this example is in communication with a cloud services 234 which may be used to store the terrain and obstacle data. Window 208 also illustrates another example embodiment where a vehicle 242 is in direct communication with a distribution center 244. Hence, a satellite communication system is not needed in embodiments to convey georeferenced delta and transmit terrain and obstacle data. Distribution center 244 is illustrated as being in communication with remote units 246-1, 246-2 through 256-n. The remote units 246-1, 246-2 and 266-n may be remote processing centers, such as cloud servers or other distribution centers. This allows for the sharing of terrain and obstacle data. In other embodiments, the vehicles may directly share georeferenced delta between themselves.

As discussed above, data that is sensed by the onboard sensors like the near-infrared cameras or millimeter wave radars which are currently used for rendering the combined view on a vision system, such as but not limited to, an Enhanced Vision System (EVS) or provide more accurate ground proximity alerts (EGPWS) may be processed to identify differences between the real imagery and an onboard loaded vehicle terrain and obstacle database. Any discrepancies between locally stored terrain and obstacle data vs sensed terrain and obstacles can be transmitted over the aircraft connectivity network to the distribution center. The distribution center may be any type of remote center such as a ground center, cloud based center or the ground operations departments. The received data may be further processed and collated on ground to enhance and upgrade the terrain and obstacle database as discussed above. As further discussed above, the terrain data available on ground can also be streamed in real time to vehicles (such as but not limited to aircrafts) to be used by them for optimal route and performance planning. For aircraft systems which have an onboard terrain and obstacle database which drives the EVS or EGPWS system, the terrain information shared from the ground may augment the onboard database to provide more real time and up to date sensed terrain and other surveillance data. For aircraft systems (and other vehicle systems) which do not have an onboard terrain and obstacle database, an embodiment provides a service based offering where the flight path information of the aircraft shares with the ground operations and the ground operations would stream back the relevant terrain and surveillance data to the aircraft. Moreover in an embodiment a vehicle terrain and obstacle database is located remote to the vehicle. In one embodiment where the vehicle terrain and obstacle database is remote the vehicle, the database is accessed via remote cloud server.

Figure 4:
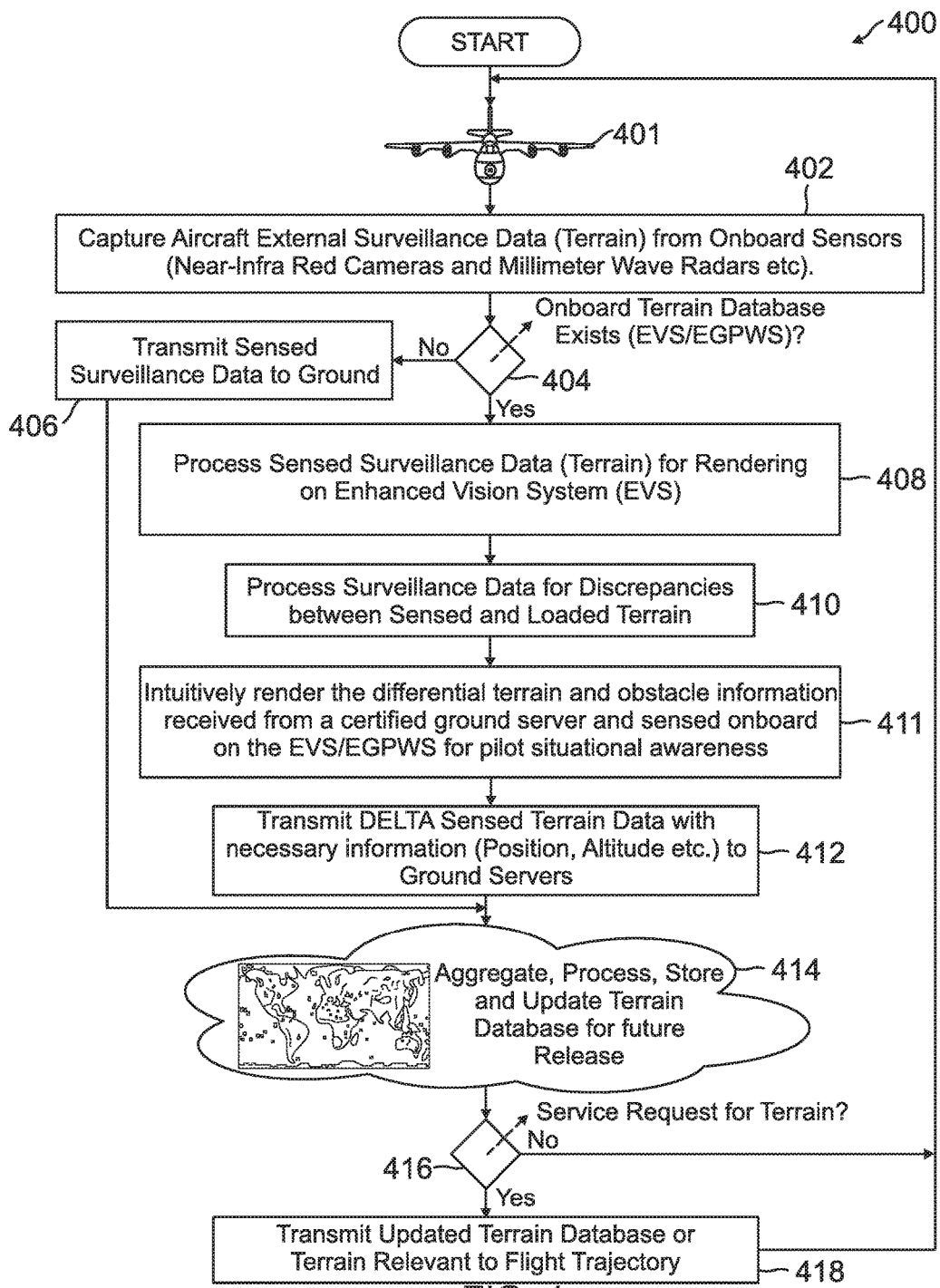
FIG. 4 is an augmented reality processed terrain and obstacle threat scouting service flow diagram of an exemplary embodiment.

An exemplary augmented reality processed terrain and obstacle threat scouting service flow diagram 400 is provided in FIG. 4. The flow diagram 400 includes blocks. The blocks of flow diagram 400 have been arranged in a generally sequential manner for ease of explanation; however, it is to be understood that this arrangement is merely exemplary, and it should be recognized that the processing associated with the methods (and the blocks shown in the Figures) can occur in a different order (for example, where at least some of the processing associated with the blocks is performed in parallel and/or in an event-driven manner).

The obstacle threat scouting service flow diagram 400 starts with a monitoring vehicle 401 (which is an aircraft in this example) capturing external surveillance data (monitored terrain and obstacle data) from on board sensors at block (402). For example, the on board sensors may include near-infra red cameras, and millimeter wave radars, etc. It is then determined if an onboard terrain and obstacle database (generally referred to as a terrain database) exists at block (404). An example of systems that will have an onboard terrain and obstacle database, in an aeronautical setting, is an EVS/EGPWS. If it is determined that the vehicle does not have an onboard terrain and obstacle database at block (404), the captured external surveillance data is transmitted to a distribution center at block (406). The distribution center may be a ground distribution center in an aeronautical setting. In an embodiment, the processing of the external surveillance data (sensor data) to determine discrepancies is done at the distribution center where the sensor data is compared with the distribution terrain and obstacle database.

This embodiment may be used when the vehicle 401 does not have an onboard terrain and obstacle database at block (404).

If it is determined that the vehicle does have an onboard terrain and obstacle database at block (404), the captured external surveillance data is processed to be rendered on a vision system such as, but not limited to, an EVS or other like system at block (408). The external surveillance or monitored data is also processed to check for discrepancies between the sensed external surveillance data and the terrain and obstacle data in the onboard vehicle terrain and obstacle database to determine any non-validated georeferenced delta at block (410). At block (411) a controller or processor of the vehicle intuitively renders the differential terrain and obstacle information received from a certified ground server (in the onboard vehicle terrain and obstacle database) and sensed onboard data on the EVS/EGPWS for pilot situational awareness. Any determined non-validated georeferenced delta, which will include location information such as position, altitude etc., is transmitted to a distribution center, such as a ground center at block (412). Upon receiving sensed surveillance data from block (406) and the non-validated georeferenced delta from block (412), the distribution center aggregates, processes, stores and updates its terrain and obstacle database for future release at block (414). As discussed above, on one embodiment the georeferenced delta that is not validated by the distribution center is marked as non-validated georeferenced delta. Once validated, such as by receiving a further confirmation of the georeferenced delta from another source, the data is entered into the terrain and obstacle database of the distribution center as validated. At block (416) it is determined if there has been a request for terrain and obstacle data from a consumer vehicle. If there has not been, the process continues at block (402) with a monitoring vehicle 401 capturing the surveillance data. If there has been a service request at block (416), the distribution center transmits then current terrain and obstacle data in the distribution terrain and obstacle database relating to an expected travel path of the requesting vehicle to the requesting vehicle at block (418). As discussed above, in one embodiment, the terrain and obstacle data in the distribution terrain and obstacle database is streamed in real time to the consumer vehicles to be used by the vehicles for optimal route and performance planning.

Figure 5:
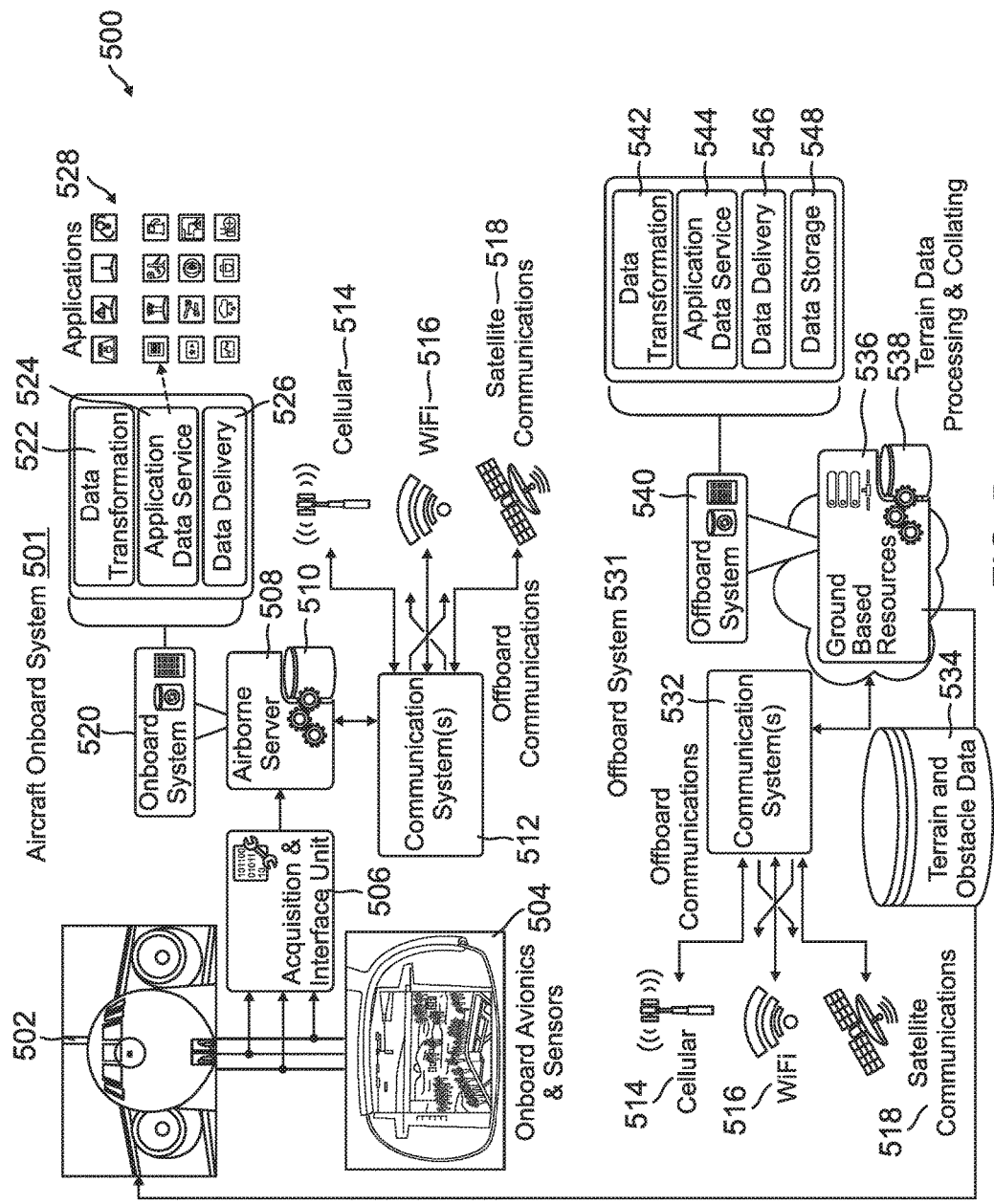
FIG. 5 is a terrain and obstacle threat detection and dissemination system illustration of an exemplary embodiment.

Referring to FIG. 5 an example, terrain and obstacle threat detection and dissemination system 500 is illustrated. This example embodiment includes an aircraft onboard system 501 and an offboard system 531. The aircraft onboard system 501 includes at least one aircraft 502. The aircraft 502 includes onboard avionics and sensors 504 that are interfaced via an acquisition and interface unit 506 to an airborne server 508 (one or more processors). A vehicle database 510 that stores terrain and obstacle data is in communication with the server 508. The airborne server 508, implements an onboard system 520 that includes at least data transformation 522, application data services 524 and data delivery 526. The function of the onboard system 520 are implement with applications 528. The Aircraft onboard system 501 further includes a communication system 512 that is in communication with the airborne server 508. The communication system 512 provides offboard communications via at least cellular 514, WiFi 516 and satellite 518 in this example embodiment. As discussed above, in embodiments the monitoring aircraft 502 uses onboard sensors 504 to gather surveillance data (monitored sensor data). The airborne server 508 (processor) compares the surveillance data with onboard terrain and obstacle data in the vehicle terrain and obstacle database 510. Detected non-validated georeferenced delta is transmitted by the communication system 512. In one embodiment, the vehicle terrain and obstacle database 510 is located remote to the vehicle 502.

The offboard system 530 may be at a ground station in an aeronautical setting. The offboard system includes a communication system 532 which is configured to receive the transmitted non-validated georeferenced delta from the aircraft onboard system 501 via either the cellular, WiFi or satellite communication systems 514, 516 and 518. Ground based resources 536 are in communications with the communication system 532. The ground based resources 536 includes one or more processors and a distribution terrain and obstacle database 538. The ground based resources 536 of the offboard system 531 also implements a ground offboard system 530 that includes at least data transformation 542, application data service 544, data delivery 546 and data storage 548. In embodiments, received non-validated georeferenced delta received by a monitoring vehicle 502 is processed, collated and added to the distribution terrain and obstacle database 538. Non-validated georeferenced delta is marked as being non-validated in the distribution terrain and obstacle database 538. When a consumer aircraft requests the latest terrain and obstacle data, the offboard system communicates the latest terrain and obstacle data 534 in the distribution terrain and obstacle database 538 to the consumer aircraft. In the example of FIG. 5, aircraft 502 is both a monitoring and a consumer aircraft 502. Although the above describes some embodiments as applying in an aeronautical setting, other applications are anticipated. For example, the system has application in land based vehicle communication systems where terrain and obstacle data may change over time.

EXAMPLE EMBODIMENTS

Example 1 is a method of implementing an augmented reality processed terrain and obstacle threat scouting service. The method includes monitoring terrain and obstacle features with at least one vehicle sensor of a monitoring vehicle. Monitored terrain and obstacle data is compared with stored terrain and obstacle data within a vehicle terrain and obstacle database that is associated with the monitoring vehicle. Monitored terrain and obstacle data that is different than the stored terrain and obstacle data within the vehicle terrain and obstacle database is transmitted. Terrain and obstacle data stored in a distribution terrain and obstacle database at a remote distribution center is validated and updated based at least in part on the transmitted monitored different terrain and obstacle data from the monitoring vehicle. Terrain and obstacle data from the distribution terrain and obstacle database located at the remote distribution center is transmitted to at least one consumer vehicle. The monitored different terrain and obstacle data from the monitoring vehicle that is not validated by the remote distribution center is presented as non-validated georeferenced delta terrain and obstacle data and is differentially highlighted from validated terrain and obstacle data received from the remote distribution center on a display system of the at least one consumer vehicle.

Example 2 includes the method of Example 1, further including broadcasting region specific terrain and obstacle data from the distribution terrain and obstacle database to the at least one consumer vehicle in response to a service request from the consumer vehicle.

Example 3 includes the method of any of the Examples 1-2, further including broadcasting the terrain and obstacle data from the distribution terrain and obstacle database from the distribution center to the at least one consumer vehicle in accordance to the database distribution cycle and process.

Example 4 includes the method of any examples 1-3, wherein the broadcasted terrain and obstacle data from the distribution terrain and obstacle database from the distribution center to the at least one consumer vehicle is certified georeferenced terrain and obstacle data.

Example 5 includes the method of any examples 1-4, further including updating a consumer vehicle terrain and obstacle database with the certified georeferenced terrain and obstacle data received from the remote distribution center.

Example 6 includes the method of any examples 1-5, further including using the updated terrain and obstacle data in the vehicle terrain and obstacle database in at least one of a synthetic vision system, an enhanced vision system, an enhanced ground proximity warning system, a flight trajectory planning and terrain avoidance system and a runway awareness and advisory system of the vehicle.

Example 7 includes the method of any examples 1-6, wherein the vehicle terrain and obstacle database is located in one of the monitoring vehicle and remote to the monitoring vehicle with access via remote cloud server.

Example 8 includes a method of operating an augmented reality processed terrain and obstacle threat scouting service. The method includes using at least one sensor of a monitoring vehicle to monitor terrain and obstacle data. The monitored terrain and obstacle data is compared with terrain and obstacle data in a terrain and obstacle database. A non-validated georeferenced delta is determined when the comparison of the monitored terrain and obstacle data with terrain and obstacle data in the terrain and obstacle database finds non-matching terrain and obstacle data. The non-validated georeferenced delta is transmitted. Moreover, the non-validated georeferenced delta is received at a consumer vehicle. Terrain and obstacle data are displayed on a synthetic vision system of the consumer vehicle. The non-validated georeferenced delta is differentiated from other terrain and obstacle data on the display.

Example 9 includes the method of claim 8, wherein the non-validated georeferenced delta includes at least one of position and elevation/height information.

Example 10 includes the method of any examples 8-9, further including receiving the transmitted non-validated georeferenced delta at a remote distribution center. A distribution terrain and obstacle database is updated based on at least in part on the received non-validated georeferenced delta. Distribution terrain and obstacle data from the distribution terrain and obstacle database is broadcast to the at least one consumer vehicle.

Example 11 includes the method of any examples 8-10, further including validating the non-validated georeferenced delta at the remote distribution center upon at least one other confirmation of the non-validated georeferenced delta.

Example 12 includes the method of any examples 8-11, wherein broadcasting distribution terrain and obstacle data from the distribution terrain and obstacle database to the at least one consumer vehicle further includes broadcasting the distribution terrain and obstacle data from the distribution terrain and obstacle database to the at least one consumer vehicle upon at least one of in response to a service request from the consumer vehicle and in accordance to a database distribution cycle and process.

Example 13 includes the method of any examples 8-12, further including updating a consumer vehicle terrain and obstacle database of the at least one consumer vehicle with the distribution terrain and obstacle data received from the remote distribution center.

Example 14 includes the method of any examples 8-13, further including receiving the transmitted non-validated georeferenced delta at a cloud based server. A distribution terrain and obstacle database is updated based on at least in part on the received non-validated georeferenced delta. Distribution terrain and obstacle data from the distribution terrain and obstacle database is broadcast to the at least one consumer vehicle.

Example 15 is a terrain and obstacle threat scouting and reporting system that includes at least one monitoring vehicle and at least one consumer vehicle. The at least one monitoring vehicle includes at least one sensor to monitor terrain and obstacle data, at least one vehicle terrain and obstacle database, at least one processor and a vehicle communication system. The at least one processor is used to compare monitored terrain and obstacle data with stored terrain and obstacle data in the vehicle terrain and obstacle database and generate a non-validated geographical delta when the monitored terrain and obstacle data and the stored terrain and obstacle data do not match. The vehicle communication system is configured to transmit the generated non-validated geographical delta. The at least one consumer vehicle includes a synthetic vision system. The synthetic vision system is configured and arranged to display received non-validated geographical delta. The non-validated geographical delta is differentially highlighted from other terrain and obstacle data displayed by the synthetic vision system.

Example 16 includes the terrain and obstacle threat scouting and reporting service of Example 15, further including a distribution center. The distribution center including a communication system to receive the non-validated geographical delta, a distribution terrain and obstacle database and at least one processor. The at least one processor is used to process the non-validated geographical delta and incorporate the non-validated geographical delta into the distribution terrain and obstacle database. The communication system is configured to broadcast the terrain and obstacle data in the distribution terrain and obstacle database to the at least one consumer vehicle.

Example 17 includes the terrain and obstacle threat scouting and reporting service of any of the Examples 15-16, wherein the communication system of the distribution center is configured to broadcast the terrain and obstacle data in the distribution terrain and obstacle database to the at least one consumer vehicle upon at least one of in response to a service request from the consumer vehicle and in accordance to a database distribution cycle and process.

Example 18 includes the terrain and obstacle threat scouting and reporting service of any of the Examples 15-17, wherein the at least one processor is configured to validate the non-validated geographical delta upon confirmation of the non-validated geographical delta from at least one other vehicle.

Example 19 includes the terrain and obstacle threat scouting and reporting service of any of the Examples 15-18, wherein the synthetic vision system of the at least one consumer aircraft is one of a synthetic vision system, an enhanced vision system, an enhanced ground proximity warning system, a flight trajectory planning and terrain avoidance system and a runway awareness and advisory system of the vehicle.

Example 20 includes the terrain and obstacle threat scouting and reporting service of any of the Examples 15-20, wherein the vehicle communication system of the at least one monitoring vehicle transmits via at least one of satellite, WiFi and cellular communication systems.

Although specific embodiments have been illustrated and described herein, it will be appreciated by those of ordinary skill in the art that any arrangement, which is calculated to achieve the same purpose, may be substituted for the specific embodiment shown. This application is intended to cover any adaptations or variations of the present invention. Therefore, it is manifestly intended that this invention be limited only by the claims and the equivalents thereof.

The invention claimed is:

1. A method of implementing an augmented reality processed terrain and obstacle threat scouting service, the method comprising:
monitoring terrain and obstacle features with at least one vehicle sensor of a monitoring vehicle;
comparing monitored terrain and obstacle data with stored terrain and obstacle data within a vehicle terrain and obstacle database that is associated with the monitoring vehicle;
transmitting monitored terrain and obstacle data that is different than the stored terrain and obstacle data within the vehicle terrain and obstacle database;
validating and updating terrain and obstacle data stored in a distribution terrain and obstacle database at a remote distribution center based at least in part on the transmitted monitored different terrain and obstacle data transmitted by the monitoring vehicle;
transmitting terrain and obstacle data from the distribution terrain and obstacle database located at the remote distribution center to at least one consumer vehicle, wherein the monitored different terrain and obstacle data from the monitoring vehicle that is not validated by the remote distribution center is presented as non-validated georeferenced delta and obstacle data; and
differentially highlighting the non-validated georeferenced delta terrain and obstacle data from validated terrain and obstacle data received from the remote distribution center on a display system of the at least one consumer vehicle.

2. The method of claim 1, further comprising:
broadcasting region specific terrain and obstacle data from the distribution terrain and obstacle database to the at least one consumer vehicle in response to a service request from the consumer vehicle.

3. The method of claim 1, further comprising:
broadcasting the terrain and obstacle data from the distribution terrain and obstacle database from the distribution center to the at least one consumer vehicle in accordance to the database distribution cycle and process.

4. The method of claim 1, wherein the broadcasted terrain and obstacle data from the distribution terrain and obstacle database from the distribution center to the at least one consumer vehicle is certified georeferenced terrain and obstacle data.

5. The method of claim 4, further comprising:
updating a consumer vehicle terrain and obstacle database with the certified georeferenced terrain and obstacle data received from the remote distribution center.

6. The method of claim 5, further comprising:
using the updated terrain and obstacle data in the vehicle terrain and obstacle database in at least one of a synthetic vision system, an enhanced vision system, an enhanced ground proximity warning system, a flight trajectory planning and terrain avoidance system and a runway awareness and advisory system of the vehicle.

7. The method of claim 1, wherein the vehicle terrain and obstacle database is located in one of the monitoring vehicle and remote to the monitoring vehicle with access via remote cloud server.

8. A method of operating an augmented reality processed terrain and obstacle threat scouting service, the method comprising:
using at least one sensor of a monitoring vehicle to monitor terrain and obstacle data;
comparing monitored terrain and obstacle data with terrain and obstacle data in a terrain and obstacle database;
generating a non-validated georeferenced delta when the comparison of the monitored terrain and obstacle data with terrain and obstacle data in the terrain and obstacle database finds non-matching terrain and obstacle data;
transmitting the non-validated georeferenced delta;
receiving the non-validated georeferenced delta at a consumer vehicle; and
displaying terrain and obstacle data on a synthetic vision system of the consumer vehicle, wherein the non-validated georeferenced delta is differentiated from other terrain and obstacle data on the display.

9. The method of claim 8, wherein the non-validated georeferenced delta includes at least one of position and elevation/height information.

10. The method of claim 8, further comprising:
receiving the transmitted non-validated georeferenced delta at a remote distribution center;
updating a distribution terrain and obstacle database based on at least in part on the received non-validated georeferenced delta; and
broadcasting distribution terrain and obstacle data from the distribution terrain and obstacle database to the at least one consumer vehicle.

11. The method of claim 10, further comprising:
validating the non-validated georeferenced delta at the remote distribution center upon at least one other confirmation of the non-validated georeferenced delta.

12. The method of claim 10, wherein broadcasting distribution terrain and obstacle data from the distribution terrain and obstacle database to the at least one consumer vehicle further comprises:
broadcasting the distribution terrain and obstacle data from the distribution terrain and obstacle database to the at least one consumer vehicle upon at least one of in response to a service request from the consumer vehicle and in accordance to a database distribution cycle and process.

13. The method of claim 8, further comprising:
updating a consumer vehicle terrain and obstacle database of the at least one consumer vehicle with the distribution terrain and obstacle data received from the remote distribution center.

14. The method of claim 8, further comprising:
receiving the transmitted non-validated georeferenced delta at a cloud based server;
updating a distribution terrain and obstacle database based on at least in part on the received non-validated georeferenced delta; and
broadcasting distribution terrain and obstacle data from the distribution terrain and obstacle database to the at least one consumer vehicle.

15. A terrain and obstacle threat scouting and reporting system comprising:
   at least one monitoring vehicle including,
      at least one sensor to monitor terrain and obstacle data;
      at least one vehicle terrain and obstacle database;
      at least one processor to compare monitored terrain and obstacle data with stored terrain and obstacle data in the vehicle terrain and obstacle database and generate a non-validated geographical delta when the monitored terrain and obstacle data and the stored terrain and obstacle data do not match; and
      a vehicle communication system configured to transmit the generated non-validated geographical delta;
   at least one consumer vehicle including,
      a synthetic vision system configured and arranged to display received non-validated geographical delta, the non-validated geographical delta being differentially highlighted from other terrain and obstacle data displayed by the synthetic vision system.

16. The terrain and obstacle threat scouting and reporting system of claim 15, further comprising:
   a distribution center including,
      a communication system to receive the non-validated geographical delta;
      a distribution terrain and obstacle database;
      at least one processor to process the non-validated geographical delta and incorporate the non-validated geographical delta into the distribution terrain and obstacle database; and
      the communication system configured to broadcast the terrain and obstacle data in the distribution terrain and obstacle database to the at least one consumer vehicle.

17. The terrain and obstacle threat scouting and reporting system of claim 16, wherein the communication system of the distribution center is configured to broadcast the terrain and obstacle data in the distribution terrain and obstacle database to the at least one consumer vehicle upon at least one of in response to a service request from the consumer vehicle and in accordance to a database distribution cycle and process.

18. The terrain and obstacle threat scouting and reporting system of claim 16, wherein the at least one processor is configured to validate the non-validated geographical delta upon confirmation of the non-validated geographical delta from at least one other vehicle.

19. The terrain and obstacle threat scouting and reporting system of claim 15, wherein the synthetic vision system of the at least one consumer vehicle is one of a synthetic vision system, an enhanced vision system, an enhanced ground proximity warning system, a flight trajectory planning and terrain avoidance system and a runway awareness and advisory system of the vehicle.

20. The terrain and obstacle threat scouting and reporting system of claim 15, wherein the vehicle communication system of the at least one monitoring vehicle transmits via at least one of satellite, WiFi and cellular communication systems.

* * * * *